United States Patent
Christ

(10) Patent No.: US 8,056,704 B2
(45) Date of Patent: Nov. 15, 2011

(54) METHOD FOR CONTROLLING THE TRANSFER OF A PRODUCT STACK IN A PACKAGING MACHINE

(75) Inventor: Richard Christ, Emmelshausen (DE)

(73) Assignee: IWK Verpackungstechnik GmbH, Stutensee (DE)

( * ) Notice: Subject to any disclaimer, the term of this patent is extended or adjusted under 35 U.S.C. 154(b) by 249 days.

(21) Appl. No.: 12/311,972

(22) PCT Filed: Aug. 22, 2007

(86) PCT No.: PCT/EP2007/007366
§ 371 (c)(1),
(2), (4) Date: Apr. 21, 2009

(87) PCT Pub. No.: WO2008/049480
PCT Pub. Date: May 2, 2008

(65) Prior Publication Data
US 2009/0320412 A1    Dec. 31, 2009

(30) Foreign Application Priority Data

Oct. 23, 2006  (DE) .......................... 10 2006 049 801

(51) Int. Cl.
*B65B 57/16* (2006.01)
(52) U.S. Cl. ....................................... 198/617; 414/802
(58) Field of Classification Search ............... 198/418.1, 198/469.1, 575, 576, 580, 602, 604, 605, 198/617, 698, 803.14; 414/789.9, 790, 790.7, 414/790.8, 802
See application file for complete search history.

(56) References Cited

U.S. PATENT DOCUMENTS

| | | | | |
|---|---|---|---|---|
| 3,533,496 A * | 10/1970 | Atwood | ................... | 198/457.07 |
| 4,637,509 A * | 1/1987 | Raudat et al. | ............... | 198/419.3 |
| 4,708,237 A * | 11/1987 | Buisson et al. | ............... | 198/726 |
| 4,883,161 A * | 11/1989 | Focke | ........................... | 198/447 |
| 5,170,880 A * | 12/1992 | Low | ........................... | 198/626.5 |
| 5,427,226 A * | 6/1995 | Ueda et al. | ................... | 198/418.6 |
| 5,657,615 A * | 8/1997 | Muller | ........................... | 53/448 |
| 6,540,063 B1 | 4/2003 | Fallas | | |
| 6,698,576 B2 * | 3/2004 | Hahnel et al. | ............... | 198/469.1 |
| 6,708,968 B2 * | 3/2004 | Honegger | ................... | 270/58.12 |
| 7,243,479 B2 * | 7/2007 | Allwein | ........................ | 53/438 |
| 7,581,634 B2 * | 9/2009 | Hart et al. | ................... | 198/418.6 |

FOREIGN PATENT DOCUMENTS

DE  33 192 247  11/1984

(Continued)

*Primary Examiner* — Douglas Hess
(74) *Attorney, Agent, or Firm* — Paul Vincent

(57) ABSTRACT

A method for controlling the transfer of a product stack in a packaging machine is provided, wherein the product stack is built up from a products during a work cycle and is subsequently transferred by means of a transfer apparatus (12) into a cell (18) of a continuously moved conveyor (16) during a transfer cycle. The product stack which is situated in the transfer apparatus and the cell of the conveyor assume a predefined relative position at least at the end of the transfer cycle. There is provision here for the movement speed of the conveyor to be changed in the event of an operationally caused lengthening of the work cycle and a resulting delayed start of the transfer cycle, in such a way that the cell or a following cell of the conveyor assumes the predefined relative position with respect to the product stack at the end of the transfer cycle.

2 Claims, 5 Drawing Sheets

FOREIGN PATENT DOCUMENTS

| | | |
|---|---|---|
| DE | 38 33 390 | 5/1989 |
| DE | 197 35 942 | 3/1999 |
| DE | 102 07 096 | 8/2003 |
| DE | 102 26 673 | 1/2004 |
| DE | 602 02 929 | 3/2006 |
| EP | 0 091 670 | 10/1983 |
| EP | 0 640 526 | 3/1995 |
| EP | 0 712 782 | 5/1996 |

\* cited by examiner

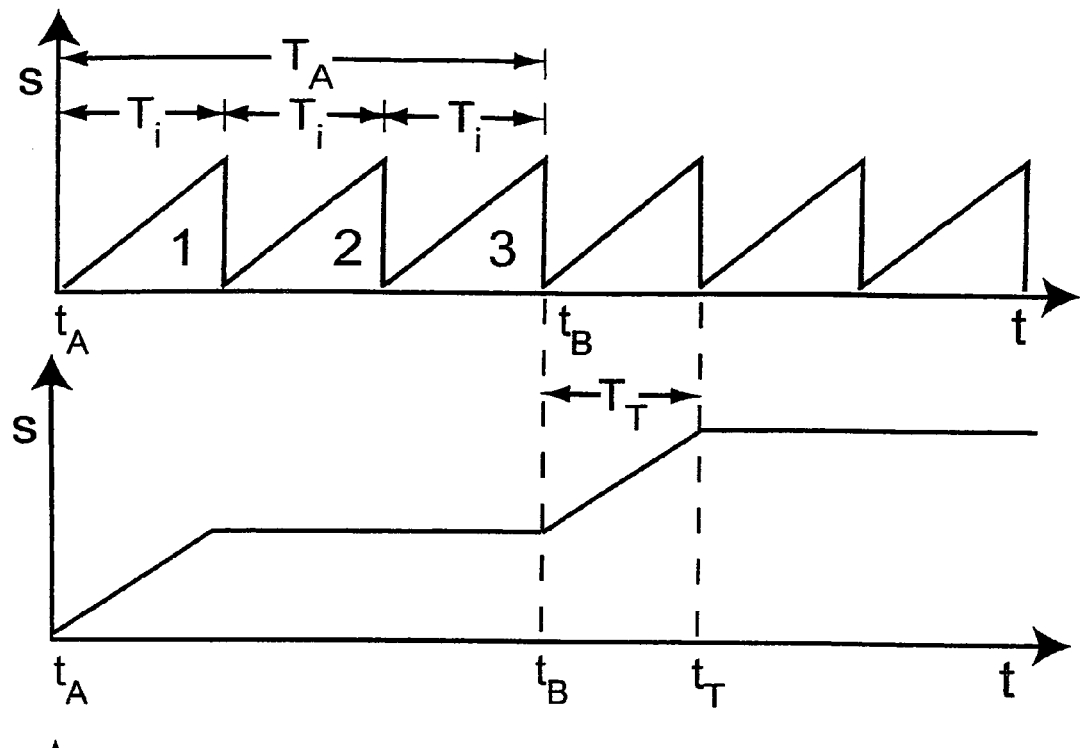
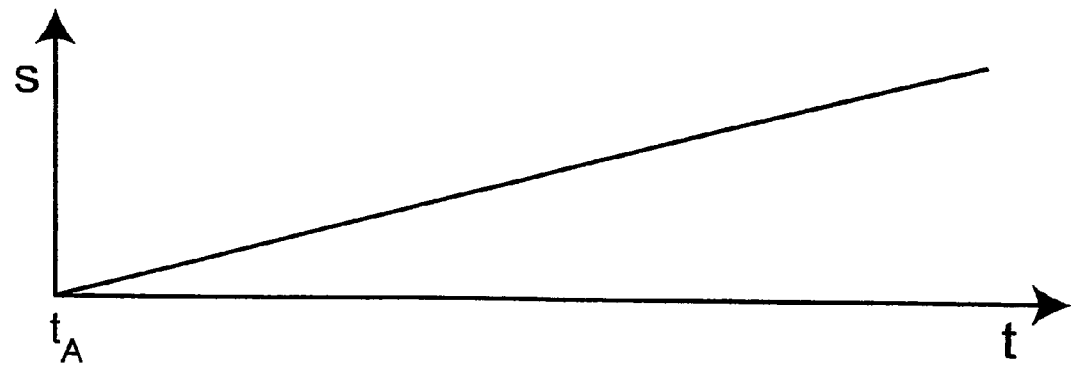
Fig. 2
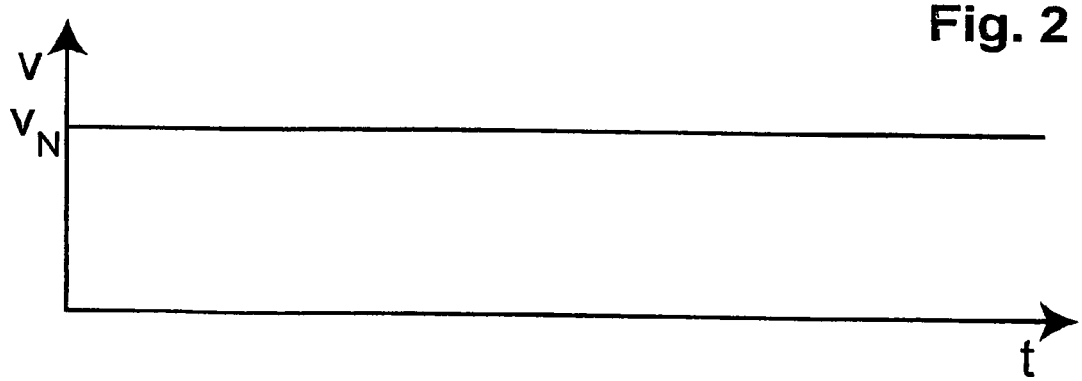
Fig. 3

METHOD FOR CONTROLLING THE TRANSFER OF A PRODUCT STACK IN A PACKAGING MACHINE

This application is the national stage of PCT/EP2007/007366 filed on Aug. 22, 2007 and also claims Paris Convention priority of DE 10 2006 049 801.1 filed Oct. 23, 2006.

BACKGROUND OF THE INVENTION

The invention concerns a method for controlling the transfer of a product stack in a packaging machine, wherein the product stack is built up from n products during one work cycle $T_A$, and is subsequently transferred by means of a transfer device into a cell of a continuously moved conveyor during a transfer cycle $T_T$, wherein the product stack that is located in the transfer device and the cell of the conveyor assume a predetermined relative position at least at the end of the transfer cycle $T_T$.

A packaging machine has a plurality of work stations or components that are moved relative to each other in a predetermined relationship with respect to time and space. Some components are thereby moved in cycles, i.e. after a transport movement by a predetermined length, the conveyor belts or chains remain still for a predetermined time period. The clocked movement therefore comprises alternating movement or transport phases and standstill phases.

A packaging machine also has several components or work stations that are driven in a continuous fashion, i.e. have no standstill phases, and are usually moved at a constant speed during normal interference-free operation of the packaging machine.

A packaging machine is described below by way of example, wherein a product to be packed is transported on a supply belt that is driven in a cyclic fashion to a stacking station, in which a product stack of n individual products is built up from successively arriving individual products, e.g. blister strips. As soon as the product stack has reached the predetermined desired number of individual products, it is inserted by a transfer device into a cell of a continuously driven product conveyor of a cartoning machine during a transfer cycle $T_T$. Continuously operating cartoning machines are advantageous compared to intermittently operating cartoning machines, in that they can be operated with higher efficiency and the product stack can be inserted into a folding box in a soft, smooth and thereby interference-free fashion. Moreover, a continuously operating cartoning machine eliminates strong decelerating and accelerating motions, which reduces the risk that the product stack falls over.

The product conveyor of the cartoning machine consists of an endless circumferential conveyor belt or a corresponding conveyor chain, the outer side of which has a plurality of chamber-like cells into each of which one product stack can be inserted. Successive cells have the same separation from each other and are defined by cell walls or boundaries that project past the outer side of the conveyor. During passage of a deflecting roller, the cells open to such an extent that the product stack can be laterally inserted into the opened cell in the running direction of the conveyor at the height of the transport plane. When the deflecting roller has been passed, the cells that have received a product stack close to such an extent that the product stack is reliably grasped by the cell walls and further transported with the conveyor.

During normal operation of the packaging machine, the individual products are continuously supplied in a cyclic fashion to the stacking station, in which a product stack is formed within one work cycle $T_A$. At the end of each work cycle $T_A$, a new product stack is provided, which is transferred by the transfer device to the respectively associated cell of the continuously operating conveyor within one transfer cycle $T_T$. In this fashion, the conveyor can be driven at a constant speed of motion.

During production of the individual products, it may happen that individual products are detected as being faulty and are therefore discarded. This may happen e.g. when a blister strip is not or is not completely filled or has turned out to be improperly sealed or have other faults. When a faulty product is detected, it is removed from the packaging process and upstream of the stacking station, thereby generating a hole in the line of successive products. As a result thereof, it takes four instead of three partial cycles, i.e. one partial cycle more, to build up a product stack that consists of e.g. three products in the stacking station, since one blister strip is missing at one position of the supply belt. In conventional packaging machines, an empty space in the product line that is generated by removing a detected faulty product, is filled with replacement products that are maintained in a storage device in order to prevent such irregularities. This method ensures that a continuous line of individual products arrives at the stacking station, and that the product stack can therefore always be built up within the predetermined work cycle $T_A$.

The intermediate storage of replacement products is, however, very complex in terms of process engineering, and automatic refilling of the product line with replacement products also requires great apparative expense and therefore high costs.

It is the underlying purpose of the invention to provide a method for controlling the transfer of a product stack in a packaging machine that facilitates formation of a product stack and its transfer to a continuously operating conveyor.

SUMMARY OF THE INVENTION

This object is achieved in accordance with the invention with a method comprising the features of the independent claim. This method provides that in case of an operationally caused extension E of the work cycle $T_A$ and resulting delayed start of the transfer cycle $T_T$, the speed of movement of the conveyor is changed in such a fashion that the cell or a following cell of the conveyor assumes the predetermined relative position with respect to the product stack at the end of the transfer cycle $T_T$.

In accordance with the invention, the gap in the product line that is supplied to the stacking station, which is generated by removing a faulty product, is not closed by a replacement product. It is accepted that the formation of the product stack is delayed by at least one partial cycle due to this gap, which also delays the start of the transfer cycle $T_T$ of the transfer device. This delay is compensated for in that the speed of movement of the conveyor to which the product stack is transferred, is changed in such a fashion, that the predetermined and required relative position between the product stack and cell of the conveyor is reached again at the end of the transfer cycle $T_T$.

In a first alternative embodiment of the invention, the speed of movement of the conveyor may at least be temporarily reduced, wherein it is preferably always kept at a value >0, i.e. the conveyor preferably never completely stops.

The inventive method is explained below with reference to an example, wherein this example does not limit the scope of protection of the invention.

In this example, a product stack is formed from three individual products within one work cycle $T_A$ that comprises three partial cycles. If there is a gap in the product line that is supplied to the stacking station, due to previous removal of a faulty product, four partial cycles are required to build up the product stack having three individual products. For this reason, the transfer cycle $T_T$ can start only with a delay of one partial cycle. When the downstream conveyor continues to move at the same speed, the cell that is to be inserted into the product stack has already passed the transfer point when the transfer device including product stack reaches the transfer location. For this reason, the speed of the conveyor is reduced in such a fashion that the product stack and the associated cell reach the transfer location at the same time and therefore assume the predetermined relative positions. At the time of transfer or immediately after transfer of the product stack, the conveyor has again assumed its normal constant speed of movement as during interference-free normal operation of the packaging machine.

When there are a relatively large number of gaps within the product line, since a plurality of faulty products has been removed from the line, it takes a long time to build up a product stack such that it is theoretically possible but useless to reduce the speed of movement of the conveyor or even stop the conveyor. In a preferred embodiment of the invention, the speed of movement of the conveyor is therefore only reduced when the extension E of the work cycle $T_A$ is smaller or equal to half the work cycle $T_A$. This is the case when a maximum of 1.5n partial cycles are required to build up a product stack that is built up from n individual products.

When the work cycle $T_A$ is extended E by a relatively long time, the speed of movement of the conveyor is advantageously not reduced in accordance with the invention, but at least temporarily increased with the result that the cell of the conveyor that was supposed to originally receive the product stack, passes the transfer location with increased speed before the product stack arrives at that location, and the product stack is then inserted into the following cell of the conveyor as usual.

In a preferred embodiment of the invention, the speed of movement of the conveyor is increased when the extension E of the work cycle $T_A$ is larger than half the work cycle $T_A$, i.e. $E > 0.5\, T_A$.

In general, one will try to fill each cell of the conveyor with one product stack, i.e. preferably reduce the speed of movement of the conveyor when the product stack is built up with a delay. In one feasible embodiment of the invention, the speed of movement of the conveyor is therefore only increased when the extension E of the work cycle $T_A$ is longer or equal to 0.6 times the work cycle $T_A$, i.e. $E > 0.6\, T_A$.

Further details and features of the invention can be extracted from the following description of embodiments with reference to the drawing.

BRIEF DESCRIPTION OF THE DRAWING

FIG. 2 shows several path-time diagrams that represent the paths of motion of the work stations of the packaging machine during normal operation;

FIG. 3 shows a speed-time diagram of the conveyor during normal operation;

DESCRIPTION OF THE PREFERRED EMBODIMENT

Figure 1:
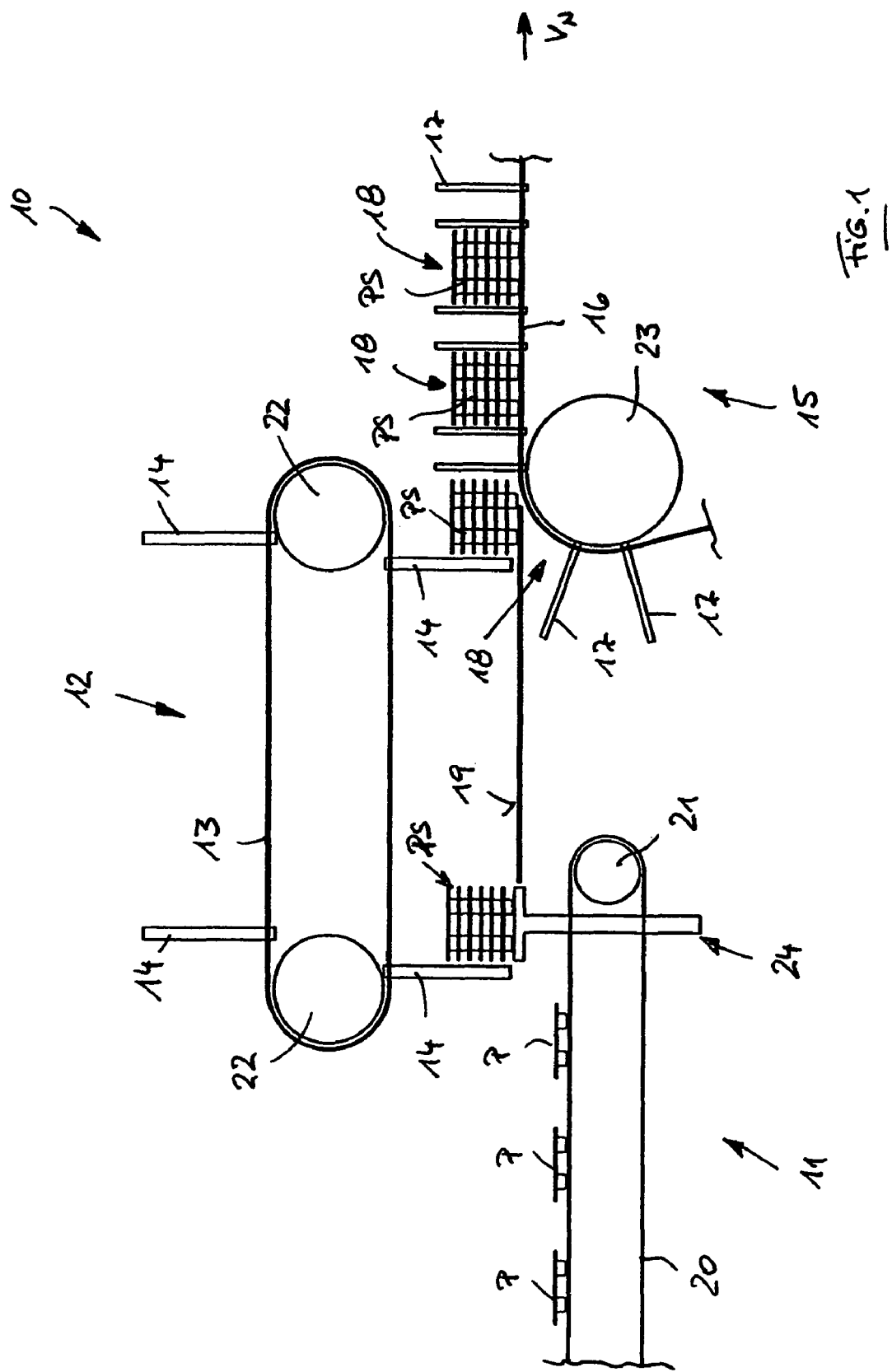
FIG. 1 shows a schematic view of the stations of a packaging machine for building up and transferring a product stack.

FIG. 1 shows a section of a packaging machine 10 with a supply unit 11 comprising a supply belt 20 that circulates via deflecting rollers 21 and supplies individual products P, which are disposed one after another and at a separation from each other on the conveyor belt 20, in an endless line to a stacking station 24 that is only schematically shown. The supply belt 20 is driven in cycles and, in the illustrated embodiment, supplies products P in the form of blister strips.

In a stacking station 24, several individual products P are stacked on top of each other to form one product stack PS. As soon as the product stack PS is finished, a transfer device 12 is activated, which has a transport belt 13 that circulates around deflecting rollers 22 and carries pusher fingers 14 on its outer surface that project in an outward direction and are separated from each other in the transport direction. As soon as the product stack PS is finished, one of the pusher fingers 14 comes into abutment with the product stack PS and pushes it laterally along a surface 19 towards a continuously driven conveyor 15. The conveyor 15 has a conveyor belt 16 that circulates via deflecting rollers 23 and carries cell walls 17 on its outer side that project in an outward direction perpendicularly to the conveying direction. One cell 18 is disposed between two successive cell walls 17 to receive one product stack PS.

As is shown in FIG. 1, the cell walls 17 are spread when they pass the deflecting roller 23, thereby opening the cell 18. This enables the transfer device 12 to insert the product stack PS into the cell 18. As soon as the cell walls 17 have completely passed the deflecting roller 23 and are located in a straight section of the course of the conveyor belt 16, the cell walls 17 are again parallel to each other and the cell 18 receives the product stack PS with tight fit, as is illustrated in FIG. 1. The process of interference-free normal operation during building up of the product stack PS and its transfer to the continuously driven conveyor 15 is described below with reference to FIGS. 2 and 3.

It is assumed that a product stack PS consists of three individual products P. The upper diagram in FIG. 2 schematically shows that building up the product stack PS with three products P requires a time period of one work cycle $T_A$ that represents the sum of three partial cycles $T_i$. One of the products P that is supplied by means of the supply unit 11 is disposed onto the product stack PS within one partial cycle $T_i$. At a time $t_B$, a product stack PS of three products P has been finished.

The second diagram in FIG. 2 shows the movements of the transfer device 12 over time. The transfer device 12 waits until the product stack PS is finished and subsequently, at a time $t_B$, transfer of the product stack PS is started, performed within one transfer cycle $T_T$, and terminated at a time $t_T$.

The third diagram in FIG. 2 shows the movement of the conveyor 15 that is moved in a continuous fashion and at a constant speed during normal operation, which is again clearly shown in FIG. 3, where the speed is shown over time. The speed $V_N$ of the conveyor 15 is constant at normal operation.

When a control, disposed in the supply direction upstream of the stacking station 24, detects a faulty product P, the product is discarded such that the space of the discarded product P on the conveyor belt 20 remains free and a gap is formed in the product line. In the following, it is assumed that the product stack PS still consists of three products P, but a gap in the product line is compensated for.

Figure 4:
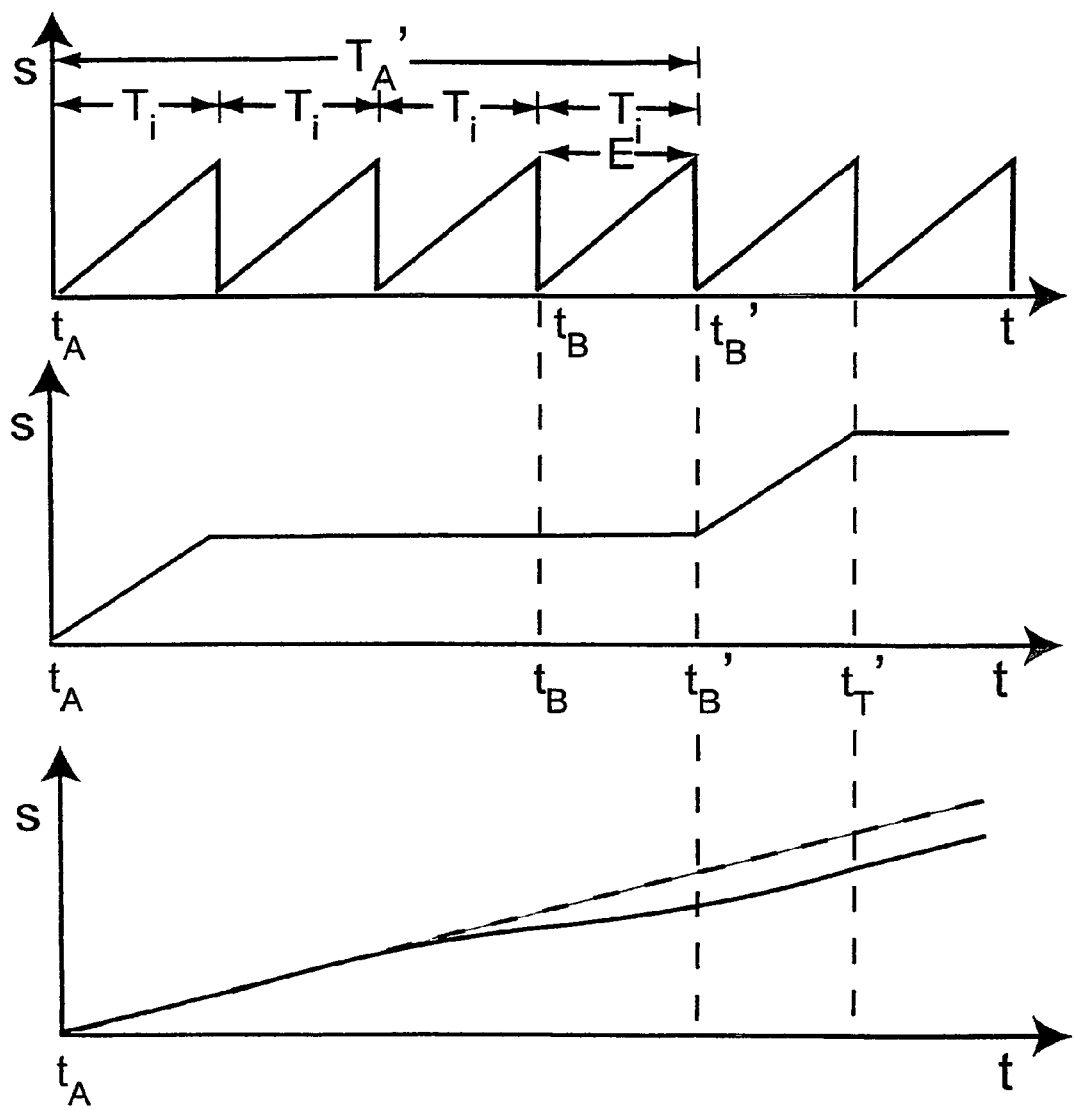
FIG. 4 shows several path-time diagrams which represent the paths of motion of the work stations of the packaging machine when the product stack is built up with a delay.

FIG. 4 shows a view that corresponds to FIG. 2 but differs therefrom in that a gap in the product line is considered. In order to build up the product stack PS, a work cycle $T'_A$ is now required, which consists of four partial cycles $T_i$, i.e. has a temporal extension E of one partial cycle $T_i$. In this case, the product stack is not yet finished at time $t_B$ but only at time $t'_B$. Towards this end, the transfer device 12 must wait until the product stack PS is finished such that the transfer movement does not start before time $t'_B$, as is illustrated in FIG. 4. The transfer of the product stack PS is terminated at time $t'_T$.

The continuously driven conveyor 15 that is moved at a constant speed of movement $V_N$ during normal operation, is adjusted to the delay while the product stack PS is being built up. The control of the packaging machine registers that a faulty product has been discarded and that building up the next product stack PS will take more time. As soon as the previous product stack PS has been properly taken over by the conveyor 15, the speed of movement of the conveyor 15 is reduced and subsequently increased again to the normal speed $V_N$ such that the transfer position for the product stack PS is obtained only at time $t'_T$, which is illustrated in the lower diagram of FIG. 4, wherein the curve that is obtained during normal operation is illustrated with dashed lines.

Figure 5:
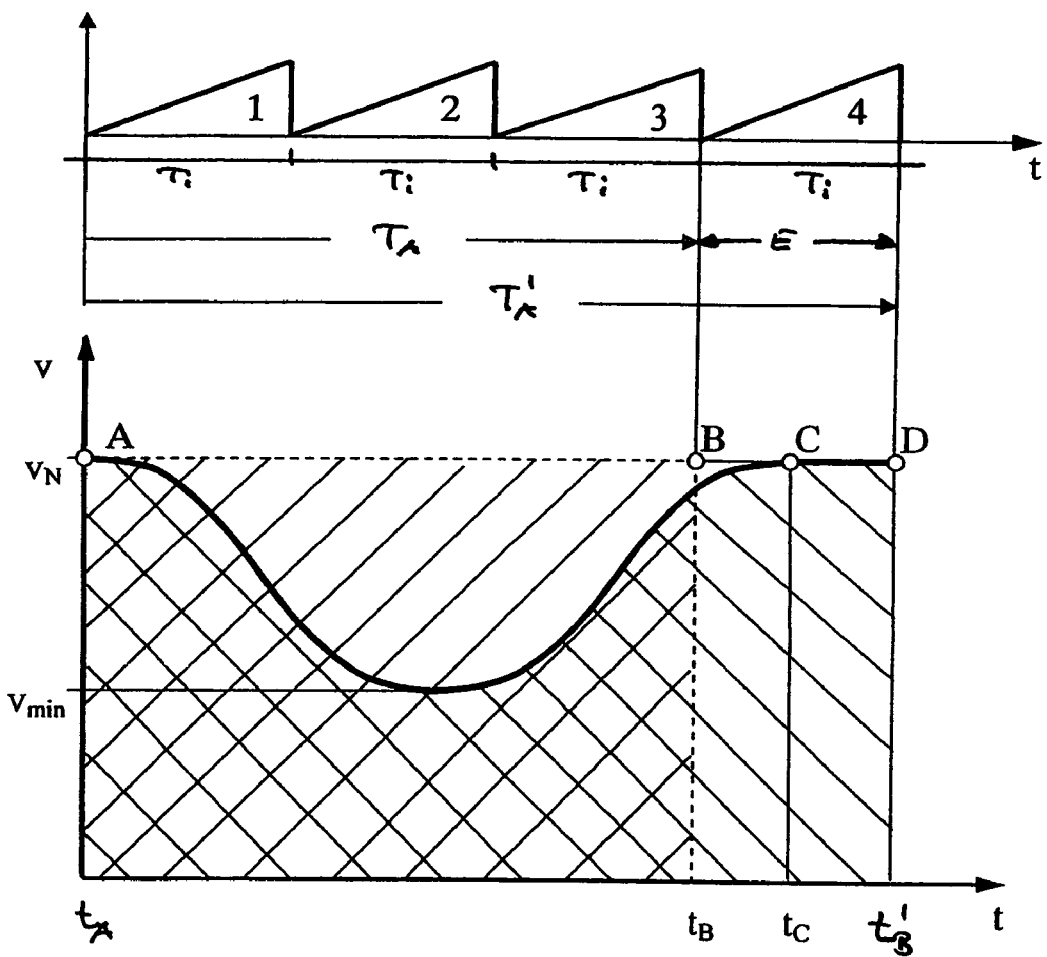
FIG. 5 shows a speed-time diagram of the conveyor with delayed building up of the product stack.

The relationships with respect to adjustment of the speed of movement of the continuously driven conveyor 15 are also shown in the speed-path diagram of FIG. 5. During normal operation, the conveyor 15 is driven at a constant speed $V_N$. In order to compensate for the delay E in building up the product stack PS, the speed of movement of the conveyor 15 is reduced to a value $V_{min}$, wherein stoppage of the conveyor 15 should be prevented. The speed of movement is subsequently increased, wherein the normal speed of movement $V_N$ is reached again at a time $t_C$ or at point C which is located within the extension E of the work cycle $T_A$. Point C should preferably be as closely as possible to the final point D or close to time $t'_B$ and thereby at the end of the extended work cycle $T'_A$ in order to minimize the speed change. In the most favorable case, points C and D coincide, i.e. the conveyor 15 reaches its normal speed of movement $V_N$ only immediately at the end of the extended work cycle $T'_A$.

For reasons of clarity, it must be noted that the area below the speed curve between times $t_A$ and $t'_B$ is as large as the area below the straight line of the speed between points A and B between times $t_A$ and $t_B$, which results during normal operation. In both cases, the area corresponds to the path that the cell has travelled or the grid dimension of successive cells 18 of the conveyor 15.

Figure 6:
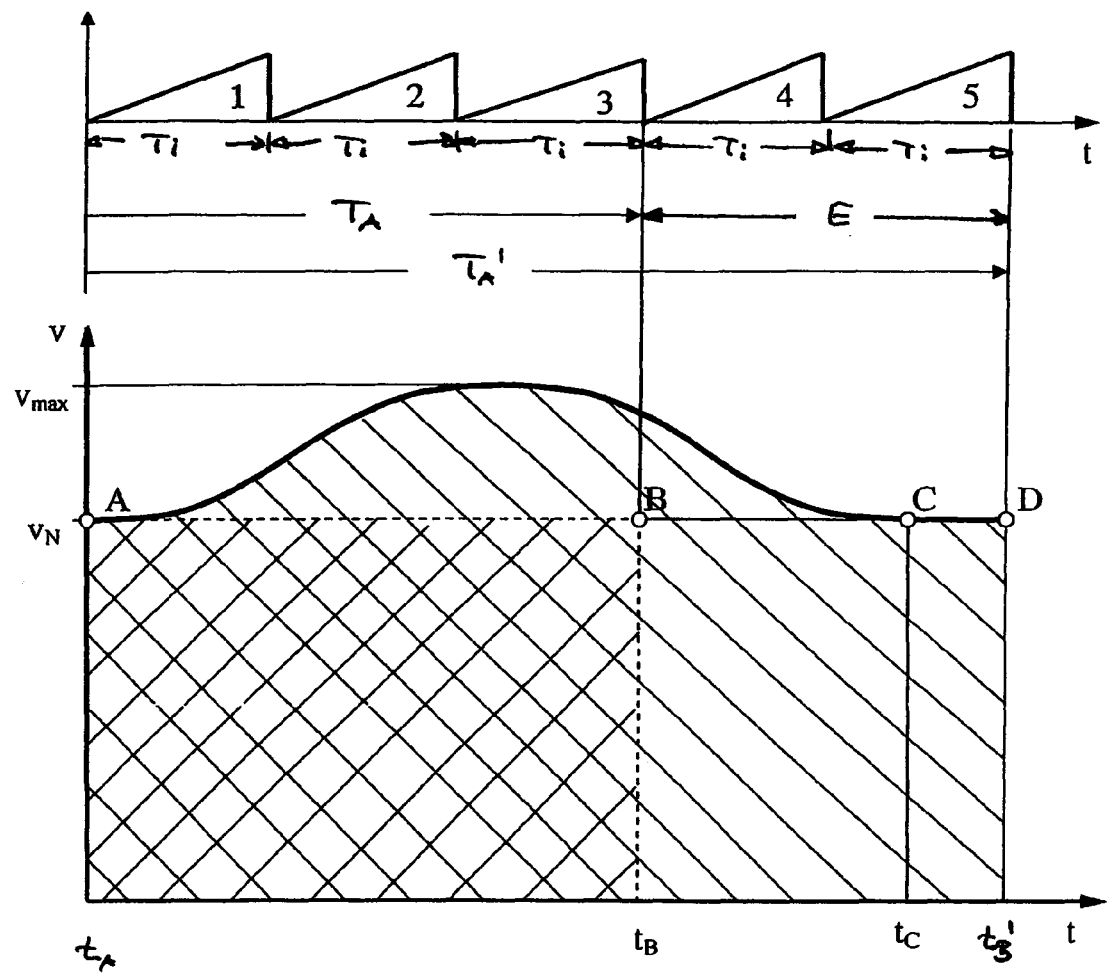
FIG. 6 shows an alternative speed-time diagram of the conveyor with delayed building up of the product stack.

In the above-described embodiment, the work cycle $T_A$, which consists of three partial cycles $T_i$ during normal operation, was extended by an additional partial cycle $T_i$, i.e. by 33.33% by rejecting a faulty product. When building up of the product stack PS is further delayed owing to several gaps in the product line, it may be reasonable not to reduce the speed of the conveyor in order to compensate for the time delay during formation of the product stack PS, but to increase the speed of movement of the conveyor 15 in order to thereby leave one cell 18 of the conveyor empty and supply the product stack PS, the formation of which has been excessively delayed, to the following cell. A corresponding example is illustrated in FIG. 6 in the form of a speed-time diagram.

It is assumed that the normal work cycle $T_A$ that is composed of three partial cycles $T_i$ is increased by two partial cycles $T_i$ due to two gaps in the product line such that the extended work cycle $T'_A$ which is required to build up the product stack PS comprises a total of five partial cycles $T_i$ and is therefore extended by 66.66%. As is shown in FIG. 6, the speed of the continuously moved conveyor 15 is then increased from the normal speed of movement $V_N$ to a speed $V_{max}$ and is subsequently reduced again to the normal speed of movement $V_N$ which is reached at point C as in the preceding example. Due to the increased speed of movement of the conveyor 15, the cell 18, into which the product stack PS should originally have been inserted, passes the transfer area and, at the transfer time of the product stack PS, the following cell 18 of the conveyor 15 has already reached the transfer area and receives the product stack PS.

The area below the speed curve in FIG. 6 between points A and D within the borders $t_A$ and $t'_{BA}$ is exactly twice as big as the area below the straight line between points A and B within the borders $t_A$ and $t'_B$ which is travelled during normal operation. Since the area represents the path of motion of the conveyor, the conveyor 15 advances by one cell separation during normal operation while, in accordance with FIG. 6, the conveyor 15 is advanced by two cell separations, thereby omitting one cell.

Only for reasons of completeness, it must be mentioned that the speed of movement of the conveyor does naturally not need to be changed when the time extension E of the work cycle $T_A$ is equal to the work cycle $T_A$ or an integer multiple thereof, since in these cases one or more cells are automatically omitted without having to adjust the speed of movement of the conveyor 15.

I claim:

1. A method for controlling the transfer of a product stack in a packaging machine, the method comprising the steps of:
    a) successively transporting individual products to a conventional stacking station, the stacking station structured to stack the individual products into a product stack;
    b) transferring, following step a), the product stack by means of a transfer device into a cell of a continuously moved conveyor during a transfer cycle, wherein the product stack that is located in the transfer device and the cell of the conveyor assume a predetermined relative position at an end of the transfer cycle; and
    c) changing a speed of movement of the conveyor in response to an operationally caused extension of the work cycle and a resulting delayed start of the transfer cycle such that the cell or a following cell of the conveyor assumes the predetermined relative position relative to the product stack at the end of the transfer cycle, wherein, in dependence on an amount of extension of the work cycle, the speed of movement of the conveyor is either temporarily reduced to a value which exceeds zero or temporarily increased, the speed of movement of the conveyor being reduced when the extension of the work cycle is smaller than or equal to half of the work cycle.

2. The method of claim 1, wherein the speed of movement of the conveyor is increased when the work cycle is extended by more than half of the work cycle.

* * * * *